(12) United States Patent
Shinke et al.

(10) Patent No.: US 7,014,822 B1
(45) Date of Patent: Mar. 21, 2006

(54) FLUID TREATING DEVICE (75) Inventors: Norihisa Shinke, Osaka (JP); Kazuhiro Hirai, Osaka (JP); Seisaku Higashiguchi, Osaka (JP)

(73) Assignee: Osaka Gas Co., LTD (JP)

( * ) Notice: Subject to any disclaimer, the term of this patent is extended or adjusted under 35 U.S.C. 154(b) by 0 days.

(21) Appl. No.: 09/868,222

(22) PCT Filed: Dec. 10, 1999

(86) PCT No.: PCT/JP99/06984

§ 371 (c)(1),
(2), (4) Date: Jun. 15, 2001

(87) PCT Pub. No.: WO00/35578

PCT Pub. Date: Jun. 22, 2000

(30) Foreign Application Priority Data

Dec. 15, 1998 (JP) .......................................... 10-355803

(51) Int. Cl.
*B01J 10/00* (2006.01)

(52) U.S. Cl. .................................................... 422/196
(58) Field of Classification Search ................ 422/196, 422/188, 193; 252/373
See application file for complete search history.

(56) References Cited

U.S. PATENT DOCUMENTS 4,374,184 A * 2/1983 Somers et al. ................ 429/17
5,741,605 A * 4/1998 Gillett et al. ................ 429/31
5,783,750 A * 7/1998 Otani ........................... 73/721
5,829,517 A   11/1998 Schmid et al.
6,492,050 B1 * 12/2002 Sammes ....................... 429/31

FOREIGN PATENT DOCUMENTS

| EP | 0 735 602 A | 10/1996 |
|---|---|---|
| GB | 197 872 A | 5/1923 |
| GB | 597 501 A | 1/1948 |
| JP | 6353857 | 3/1988 |
| JP | 5155602 | 6/1993 |
| JP | 10189021 | 7/1998 |
| JP | 861802 | 9/1998 |

* cited by examiner

*Primary Examiner*—Jonathan Johnson
(74) *Attorney, Agent, or Firm*—The Webb Law Firm (57) ABSTRACT

A fluid processing apparatus having a plurality of processing spaces (S) includes a plurality of containers (B) juxtaposed in a direction to each other forming processing spaces (S) respectively therein. Pressing means (H) is provided for pressing the containers (B) as juxtaposed from opposed sides thereof in the juxtaposing direction of the containers. Each container (B) includes a pair of container-forming members (41a) disposed in the juxtaposing direction and having peripheral portions thereofjoined and welded to each other. At least one of the container-forming members (41a) is in the form of a dish-like member having a peripheral portion used as a joining margin and a bulging central portion.

12 Claims, 6 Drawing Sheets

FLUID TREATING DEVICE

TECHNICAL FIELD

The present invention relates to a fluid processing apparatus for producing hydrogen-containing gas, the apparatus having a plurality of processing spaces for processing fluid.

BACKGROUND ART

A fluid processing apparatus of the above-noted type processes fluid by using the plurality of processing spaces. For instance, one (or some) of the processing spaces is (are) charged with reforming reaction catalyst to act as a reforming reaction unit for effecting a reforming process in which a hydrocarbon raw fuel gas is reformed, by using water vapor, into hydrogen gas and carbon monoxide gas and another (others) of them is charged with metamorphic reaction catalyst to act as a metamorphic reaction unit for effecting a metamorphic process in which the carbon monoxide gas is metamorphosed, by using water vapor, into carbon dioxide gas. In this manner, according to the apparatus, the raw fuel gas is supplied to the reforming reaction unit to be reformed therein and the resultant reformed gas is supplied to the metamorphic reaction unit to be metamorphosed therein, so that a hydrogen-containing gas is produced by the apparatus.

Figure 11:
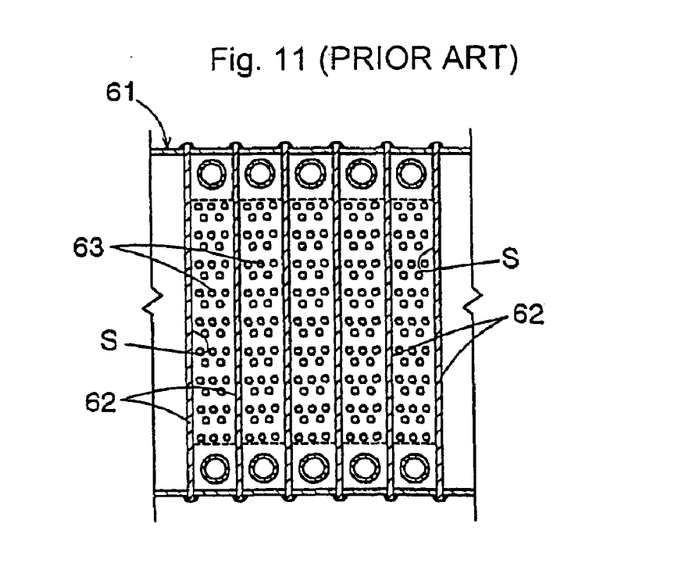
FIG. 11 is a vertical section showing principal portions of a conventional fluid processing apparatus.

According to a conventional construction, as shown in FIG. 11 for example, within an angular cylindrical body, a plurality of partitioning plates 62 are arranged side by side in a spaced relationship along the longitudinal direction of the angular cylindrical body. And, peripheral portions of the respective partitioning plates 62 are connected by welding to the angular cylindrical body in a gas-tight manner, thereby to form a plurality of processing spaces S partitioned from each other inside the angular cylindrical body 61.

Incidentally, each processing space is charged with a number of porous ceramic particles 63 retaining catalyst for each kind of reaction.

However, according to the conventional art, depending on the type of apparatus different in e.g. the number of the processing spaces, the capacity of each space, etc., a different complicated designing is needed for each particular type of the apparatus. And, also, each type requires special components (especially, the angular cylindrical body) for that particular type. Hence, co-utilization of the apparatus components is difficult. All these contribute to increase of the apparatus costs.

On the other hand, with such fluid processing apparatus, high-temperature process is usually effected in the processing space using the catalytic reaction. With repeated activation and de-activation of the apparatus, the components of the apparatus are expanded and contracted repeatedly. Further, if a plurality of kinds of processes are carried out using the plurality of processing spaces, the processing temperatures of the respective processes are usually different, thus resulting in the difference among the expansion amounts of the components among the processing spaces.

According to the conventional apparatus, however, the respective components of the apparatus are inflexibly connected to each other by means of welding. Hence, with repeated expansion and contraction of the components associated with repeated activation and deactivation of the apparatus and/or difference between the expansion amounts in the components due to the temperature difference in the processing temperatures among the processing spaces, a significant stress is applied to each component or its welded portion.

Then, in order to improve the durability of the apparatus, it is necessary to employ components of higher strength and also to provide welding connection of higher reliability. On the other hand, troublesome operations are required for e.g. providing the gas-tight welding connection between the peripheral portion of the partitioning plate to the angular cylindrical body. For this reason, the welding operation could not be automated. And, even if it is done manually, this manual operation requires skilled and well-experienced labor.

Accordingly, all these combined have resulted in higher costs.

DISCLOSURE OF THE INVENTION

The present invention has been made in view of the above-described state of the art and its object is achieve cost reduction, while ensuring good durability.

For accomplishing the above object, according to the present invention, to construct a fluid processing apparatus for producing hydrogen-containing gas, having a plurality of processing spaces, the apparatus comprises:

a plurality of containers juxtaposed in a direction to each other and forming the processing space respectively therein;

pressing means for pressing the containers as juxtaposed from opposed sides thereof in the juxtaposing direction of the containers;

wherein each said container includes a pair of container-forming members disposed in the juxtaposing direction and having peripheral portions thereof joined and welded to each other; and at least one of the pair of container-forming members is in the form of a dish-like or dish-shaped member having a peripheral portion used as a joining margin and a bulging central portion.

That is, according to this construction, the fluid processing apparatus for producing hydrogen-containing gas is constructed by juxtaposing a desired number of containers respectively forming the processing spaces under the predetermined condition.

Moreover, according to this construction, even if the number of processing spaces or the type of apparatus is different, the apparatus may be constructed merely by juxtaposing a certain number of containers corresponding to the desired number of processing spaces required by that particular type of apparatus. Also, even if the capacity of the processing space for a certain kind of process is to be increased, this can be dealt with merely by juxtaposing the number of containers required for obtaining the increased capacity.

Accordingly, the designing factors to be considered to cope with the change in the number of processing spaces and the capacity of each processing space to be formed can be as simple as mere consideration of the number of containers to be disposed. Further, it is possible to employ the identical container for constructing different types of apparatus, so that co-utilization of the apparatus components can be promoted. All these combined can contribute to the cost reduction.

Furthermore, the plurality of containers are juxtaposed with opposed sides of this container assembly being pressed by the pressing means. Under this pressed condition, the restriction of movement imposed on the containers by the pressing means is the restriction from the opposed sides in the juxtaposing direction, while no restriction being imposed thereto in a direction normal to the juxtaposing direction, whereby a relative movement between the containers in this direction is substantially allowed. Further, each container includes a pair of container-forming members disposed in the juxtaposing direction and having peripheral portions thereof joined and welded to each other; and at least one of the pair of container-forming members is provided in the form of a dish-like member having a peripheral portion used as a joining margin and a bulging central portion. That is to say, viewing the relationship between the peripheral portion and the central portion of the member, the central portion bulges relative to the peripheral portion, with forming a curved portion, as viewed in cross section, between the central portion and the peripheral portion.

Accordingly, even with repeated expansion and contraction of each container due to repeated activation and deactivation of the apparatus and/or with difference in the expansion amounts in the respective containers due to the difference in the processing temperatures in the containers, the respective containers can be freely expanded or contracted as moving relative to each other in the direction normal to their juxtaposing direction, whereby generation of stress may be advantageously restricted. Moreover, the stress if generated may be effectively absorbed through elastic deformation in the dish-like container-forming member having the bulging central portion (more particularly, the stress may be absorbed through deformation at the curved transition portion between the peripheral portion and the central portion). As a result, it is possible to effectively restrict the stress to affect the respective components of the apparatus.

Therefore, while ensuring as good as or even better durability than the convention, it is possible to reduce the specifications of the apparatus components. Also, since the pair of container-forming members are joined together by means of welding by using their peripheral portions as the joining margins, the welding operation may be readily carried out even for obtaining welding connection of higher reliability, without requiring high skilled or experienced labor. And, it is easy to automate this operation.

In the above-described construction, preferably, some or all of the plurality of containers each includes a pair of the dish-like or dish-shaped container-forming members joined and welded together with a planar plate-like or plate-shaped partitioning member interposed therebetween for forming two processing spaces.

By using such container having two processing spaces therein, it is possible to reduce the total number of containers to be provided. So that, the assembly operation may be facilitated and further cost reduction can be achieved.

Further, if the above type of container having two processing spaces is employed for forming two processing spaces requiring heat exchange therebetween, efficient heat exchange becomes possible, thus achieving improvement of heat exchange.

Preferably, in the above-described construction, the plurality of containers are disposed such that some of them requiring heat transfer therebetween are disposed in close contact with the other and others of them requiring adjustment in the amount of heat transferred therebetween are disposed with an insulating material for heat transfer adjustment being interposed therebetween.

With the above construction, with efficient heat exchange between those processing spaces requiring heat exchange and with also minimizing the radiation loss through the adjustment of heat transfer amount by the insulating material, the respective processing spaces may be adjusted to appropriate temperatures.

Accordingly, with reduction in the consumption amount of the energy needed for heating, it has become possible to promote energy conservation.

Moreover, in the above-described construction, preferably, one or some of the processing spaces is/are charged with reforming reaction catalyst to act as a reforming reaction unit for effecting a reforming process in which a hydrocarbon raw fuel gas is reformed, by using water vapor, into hydrogen gas and carbon monoxide gas and another or others of them is/are charged with metamorphic reaction catalyst to act as a metamorphic reaction unit for effecting a metamorphic process in which the carbon monoxide gas is metamorphosed, by using water vapor, into carbon dioxide gas, whereby the raw fuel gas is supplied to the reforming reaction unit to be reformed therein and the resultant reformed gas is supplied to the metamorphic reaction unit to be metamorphosed therein, so that a hydrogen-containing gas is produced by the apparatus.

That is to say, for the reforming process for reforming the hydrocarbon raw fuel gas, by using water vapor, into hydrogen gas and carbon monoxide gas, a high temperature as high as 700 to 750° C approximately is needed. Whereas, for the metamorphic process for processing the carbon monoxide gas, by using water vapor, into carbon dioxide gas, a temperature of 200 to 400° C is sufficient. Therefore, the temperature in the processing space for the reforming process is high and there is developed a significant temperature difference between the processing space for effecting this reforming process and the processing space for effecting the metamorphic process.

Therefore, with such fluid processing apparatus for producing a hydrogen-containig gas with low carbon monoxide gas content from hydrocarbon raw fuel gas using water vapor, the problem to be solved by the present invention appears even more conspicuous. And, if the present invention is applied to such fluid processing apparatus, the effect of the invention may be achieved distinctly.

Further, in the above-described construction, preferably, a processing space adjacent said reforming reaction unit is constructed as a combustion reaction unit for combusting fuel gas for heating the reforming reaction unit;

one of an adjacent pair of processing spaces is constructed as a water-vapor generating unit for generating water fed thereto and the other is constructed as a heating-fluid passage unit for passing exhaust fuel gas discharged from the combustion reaction unit to heat the water-vapor generating unit;

a processing space adjacent said metamorphic reaction unit is constructed as a cooling-fluid passage unit for passing the exhaust fuel gas discharged from the heating-fluid passage unit so as to cool the metamorphic reaction unit; and the water vapor generated at said water-vapor generating unit is supplied to the reforming reaction unit to be used in the reforming reaction therein.

That is to say, according to this construction, the fluid processing apparatus for producing a hydrogen-containing gas with low carbon monoxide gas content from hydrocarbon raw fuel gas using water vapor incorporates also therein a water-vapor generating unit for generating water vapor needed for the reforming process for reforming the hydrocarbon raw fuel gas.

In this case, the reforming reaction unit and the water-vapor generating unit need to be heated separately. However, by taking the advantage of the fact that water evaporates at a lower temperature than that of the reforming reaction between the raw fuel gas and water vapor, the combustion reaction unit is disposed adjacent the reforming reaction unit so as to heat this reforming reaction unit to the high temperature and the exhaust fuel gas discharged from the combustion reaction unit is caused to flow into the processing space adjacent the water-vapor generating unit for heating this water-vapor generating unit.

Then, the single combustion reaction unit can heat both the reforming reaction unit and the water-vapor generating unit to their respectively appropriate temperatures. As a result, the compactness, cost reduction and energy consumption reduction can be achieved.

Further, the exhaust fuel gas which has been reduced in temperature after heating the water-vapor generating unit is guided into the processing space adjacent the metamorphic reaction unit for cooling this metamorphic reaction unit for effecting the metamorphic reaction which is an exothermic reaction.

As a result, since the exhaust fuel gas from the combustion reaction unit is utilized also as the cooling medium for cooling the metamorphic reaction unit, it is possible to reduce the cost of hydrogen-containing gas production, compared to a construction using a separate cooling medium dedicated to this function.

Therefore, in the case of the fluid processing apparatus for producing a hydrogen-containing gas with low carbon monoxide gas content from hydrocarbon raw fuel gas using water vapor, the apparatus may be constructed as a compact and low-cost integrated system which can produce the hydrogen-containing gas in an economical manner with supply of the raw fuel gas, water and fuel gas thereto.

BEST MODE OF EMBODYING THE INVENTION

Next, an embodiment of the present invention embodying the invention as a fluid processing apparatus for producing a hydrogen-containing gas will be described with reference to the accompanying drawings.

Figure 1:
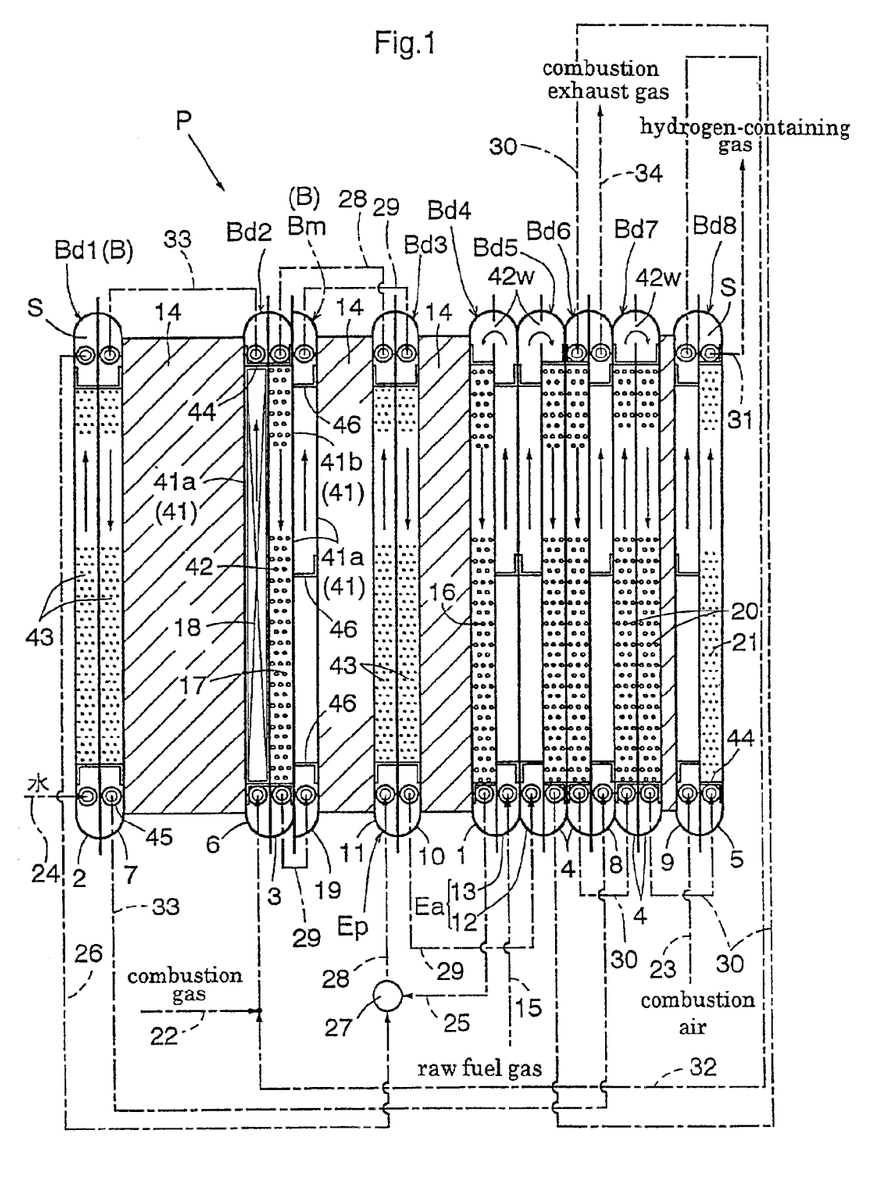
FIG. 1 is a front view in vertical section showing principal portions of a fluid processing apparatus for producing hydrogen-containing gas.
Figure 9:
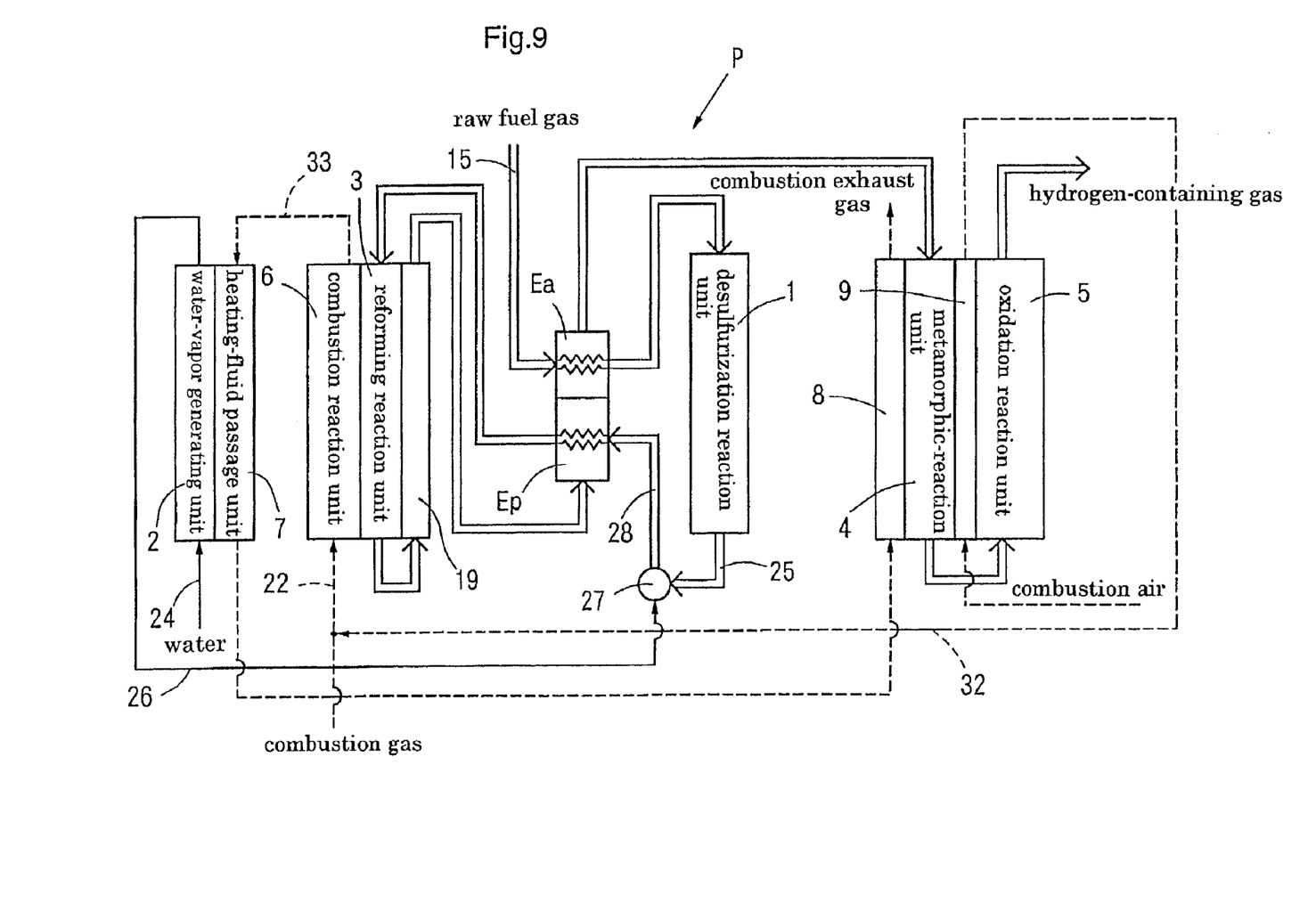
FIG. 9 is a block diagram of the fluid processing apparatus for producing hydrogen-containing gas.

As shown in FIG. 1 and also in FIG. 9, a fluid processing apparatus P includes a desulfurization reaction unit 1 for desulfurizing a hydrocarbon raw fuel gas such as natural gas, a water-vapor generating unit 2 for heating water supplied thereto to generate water vapor, a reforming reaction unit 3 for reforming the desulfurized raw fuel gas discharged from the desulfurization reaction unit 1 into hydrogen gas and carbon monoxide gas by using the water vapor generated at the water-vapor generating unit 2, a metamorphic reaction unit 4 for metamorphosing the carbon monoxide gas contained in the reformed gas discharged from the reforming reaction unit 3 into carbon dioxide gas by using water vapor, and an oxidation reaction unit 5 for selectively oxidizing the carbon monoxide gas remaining in the metamorphosed gas discharged from the metamorphic reaction unit 4. With these, the apparatus produces a hydrogen-containing gas with low carbon monoxide content.

The apparatus further includes a combustion reaction unit 6 for combusting a fuel gas to heat the reforming reaction unit 3, a heating-fluid passage unit 7 for passing heating fluid for heating the water-vapor generating unit 2, a metamorphic-reaction unit cooling-fluid passage unit 8 for passing cooling medium for cooling the metamorphic reaction unit 4, an oxidation-reaction unit cooling-medium passage unit 9 for passing cooling medium for cooling the oxidation reaction unit 5, a reforming gas heat exchanger Ep for heating the reforming gas (mixture gas of the desulfurized gas and water vapor) supplied to the reforming reaction unit 3 by means of the high-temperature reforming gas discharged from the reforming reaction unit 3, and a fuel-gas heat exchanger Ea for heating the raw fuel gas supplied to the desulfurization reaction unit 1 by means of the high-temperature reforming gas.

As shown in FIG. 1, the fluid processing apparatus P includes a plurality of processing spaces S for processing fluids, these spaces S are used for constructing the above-described various reaction units, fluid passage units and heat exchangers.

More particularly, of the plurality of processing spaces S, some processing spaces S are charged with desulfurization reaction catalyst for desulfurizing the hydrocarbon raw fuel gas for forming the desulfurization reaction units 1, others processing spaces S are used for forming the water-vapor generating units 2 for heating water supplied thereto to generate water vapor; still other processing spaces S are charged with reforming reaction catalyst for reforming the raw fuel gas into hydrogen gas and carbon monoxide gas by using water vapor, thus forming the reforming reaction units 3, still other processing spaces S are charged with metamorphic reaction catalyst for metamorphosing carbon monoxide gas into carbon dioxide gas by using water vapor, thus forming the metamorphic reaction units 4 and sill other processing spaces S are charged with selective-oxidation catalyst for selectively oxidizing carbon monoxide gas, thus forming the selective oxidation reaction units 5.

In operation, the raw fuel gas is supplied to the desulfurization reaction unit 1 to be desulfurized therein. The desulfurized gas discharged from the desulfurization reaction unit 1 and water vapor generated at the water-vapor generating unit 2 are together supplied to the reforming reaction unit 3 to be reformed therein. Then, the reformed gas from this reforming reaction unit 3 is supplied to the metamorphic reaction unit, so that carbon monoxide gas present in the reformed gas is metamorphosed into carbon dioxide gas. Further, the metamorphosed gas from this metamorphic reaction unit is 4 is supplied to the selective-oxidation reaction unit 5, in which carbon monoxide gas still remaining in the metamorphosed gas is selectively oxidized, so that hydrogen-containing gas with low carbon monoxide content is obtained.

Moreover, the processing space adjacent the reforming reaction unit 3 is constructed as the combustion reaction unit 6 for combusting the combustion gas, the processing space adjacent the water-vapor generating unit 2 is constructed as the heating-fluid passage unit 7 for passing the exhaust fuel gas from the combustion reaction unit 6 for heating the water-vapor generating unit, the processing space adjacent the metamorphic reaction unit 4 is constructed as the metamorphic-reaction unit cooling-medium passage unit 8 for passing the exhaust fuel gas from the heating-medium passage unit 7 for cooling the metamorphic reaction unit 4, and the processing space S adjacent the oxidation reaction unit 5 is constructed as the oxidation-reaction unit cooling-medium passage unit 9 for passing combustion air supplied to the combustion reaction unit 6 for cooling the oxidation reaction unit 5.

Still further, of the plurality of processing spaces S, one of an adjacent pair of processing spaces S is constructed as an upstream reformed-gas passage unit 10 for passing the reformed gas discharged from the reforming reaction unit 3 and the other of the pair is constructed as a reforming-gas passage unit 11 for passing reforming gas (gas to be reformed) to be supplied to the reforming reaction unit 3. These upstream reformed-gas passage unit 10 and the reforming-gas passage unit 11 together constitute the reforming-gas heat exchanger Ep.

One of a further adjacent pair of processing spaces S is constructed as a downstream reformed-gas passage unit 12 for passing the reformed gas discharged from the upstream reformed-gas passage unit 10 and the other of the pair is constructed as a raw-fuel gas passage unit 13 for passing the raw fuel gas to be supplied to the desulfurization reaction unit 1. These downstream reformed-gas passage unit 12 and the raw-fuel gas passage unit 13 together constitute the raw-fuel gas heat exchanger Ea.

Figure 7:
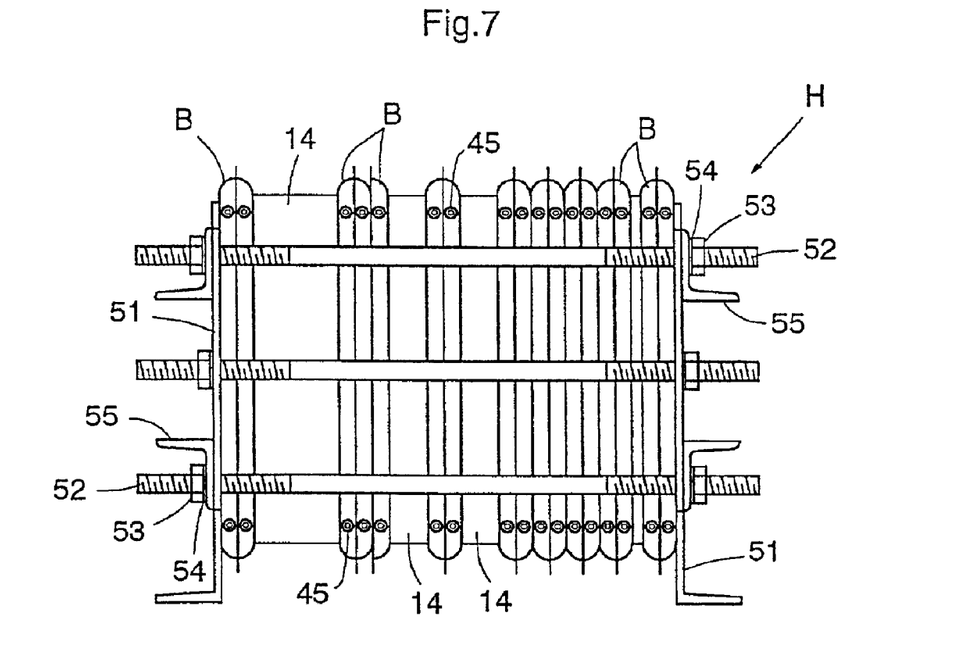
FIG. 7 is a front view showing an overall schematic construction of the fluid processing apparatus for producing hydrogen-containing gas.

As shown in FIGS. 1 and 7, each processing space S is formed by a flat container B having a flat rectangular plate-like shape. Then, a plurality of these containers B are juxtaposed in a direction of thickness of the flat shape with some of them requiring heat transfer therebetween being disclosed in close contact with each other and others requiring adjustment of heat transfer amount therebetween being disposed with a heat insulating material 14 for adjusting heat transfer amount.

And, a pressing means H is provided for pressing these containers as juxtaposed from opposed sides thereof in the juxtaposing direction with allowing relative movement of the containers in a direction normal to the juxtaposing direction.

Each container B is formed by welding and joining a pair of container-forming members 41 disposed in the juxtaposing direction at peripheral portions thereof, and at least one of the pair of container-forming members 41 is provided in the form of a dish-like member having a bulging central portion and a peripheral portion to be used as a joining margin.

Figure 2:
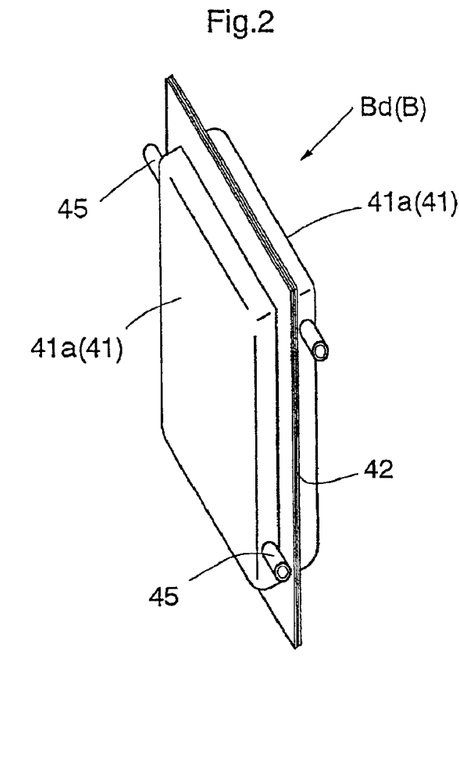
FIG. 2 is a perspective view of a container used in the fluid processing apparatus for producing hydrogen-containing gas.
Figure 3:
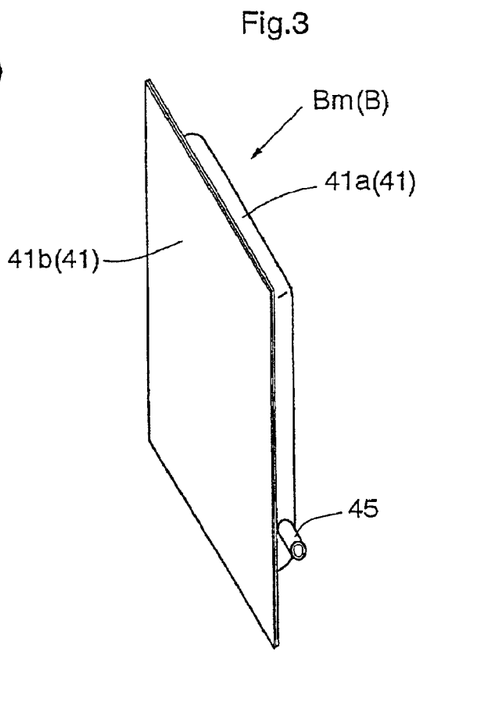
FIG. 3 is a perspective view of the container used in the fluid processing apparatus for producing hydrogen-containing gas.
Figure 5:
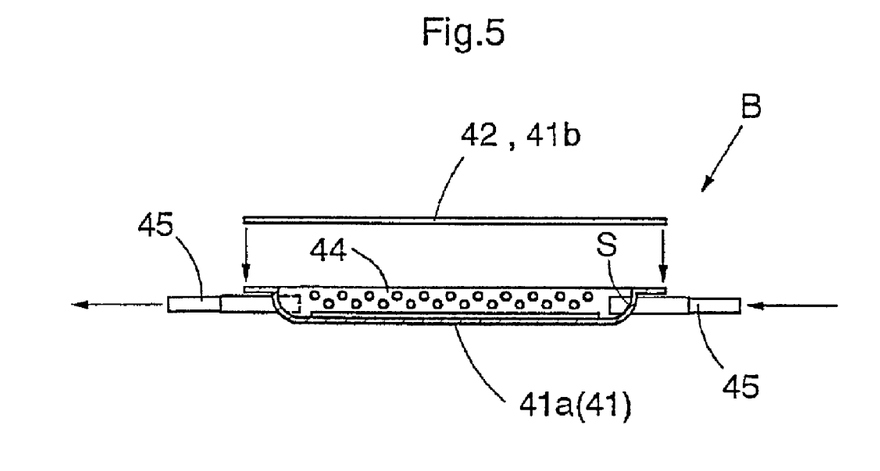
FIG. 5 is an exploded plan view of the container used in the fluid processing apparatus for producing hydrogen-containing gas.

More particularly, as shown also in FIGS. 2 and 3, some of the plurality of containers B are constructed as single-space containing containers Bm each formed of a dish-like container-forming member 41a and a flat plate-like container-forming member 41b welded and joined together at the peripheral portions thereof thereby to form a single processing space S. The others of the containers B are constructed as double-space containing containers Bd each formed of a pair of the dish-like container-forming member 41a which are welded and joined together with a flat-plate like partitioning member 42 being interposed therebetween, thereby to form two processing spaces S. Referring to the dish-like member, as shown in a section view of FIG. 5 for example, the member includes a curved transition portion between the peripheral portion and the central portion. In the case of FIG. 5, the curved portion has an arc shape which is convex relative to the bulging direction of the central portion.

Figure 4:
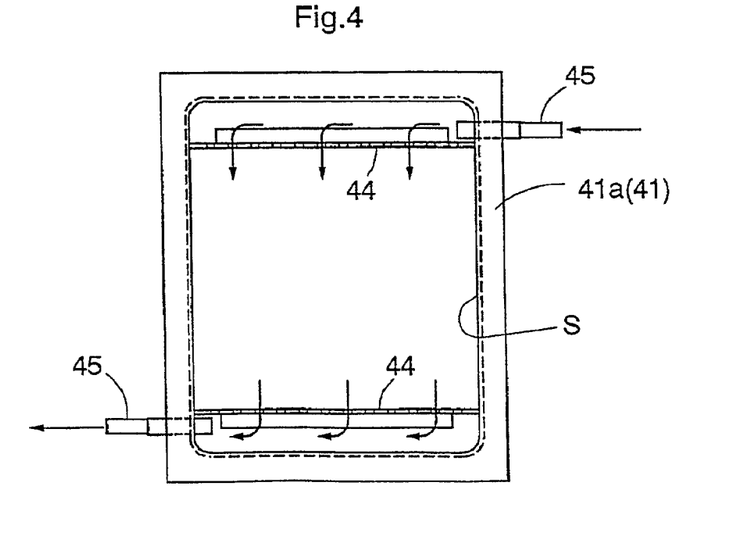
FIG. 4 is a side view in vertical section of the container used in the fluid processing apparatus for producing hydrogen-containing gas.

As shown also in FIGS. 4 and 5, in the case of the container B for forming the processing space S charged with catalyst to be used as a reaction unit, a pair of porous plates 44 are mounted within the central recess of the dish-like container-forming member 41a at spaced opposite sides of the dish-like container-forming member 41a in the direction of face thereof, so that the pair of porous plates 44 and the flat plate-like container-forming member 41b or the partitioning member 42 together form an accommodation space for accommodating the catalyst therein.

In operation, the gas to be processed flows through one porous plate 44 in the processing space S into the space charged with catalyst, and the gas past this catalyst-charged space then flows through the other porous plate 44 to exit from the space.

Incidentally, to the dish-like container-forming member 41a, when necessary, there is/are attached a gas feeding and/or discharging nozzle(s) 45 for establishing communication between the catalyst-charged space within the recess and the outside. That is, either gas-feeding or discharging nozzle 45 or both gas-feeding and discharging nozzles will be attached thereto.

Figure 6:
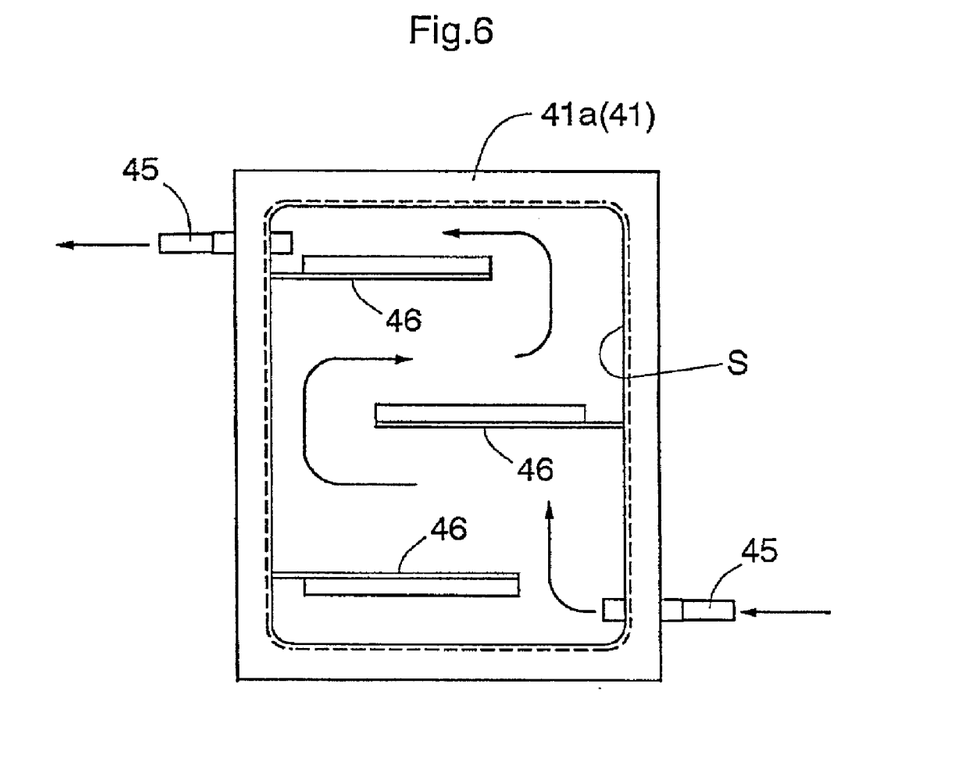
FIG. 6 is a side view in vertical section of the container used in the fluid processing apparatus for producing hydrogen-containing gas.

As shown also in FIG. 6, in the case of the containers B forming the processing spaces used as the fluid passage units, within the recess of the dish-like container-forming member 41a, there are mounted a plurality (three in this particular embodiment) baffle plates 46 spaced apart from each other in the direction of the face of the dish-like container-forming member 41a, so as to guide the gas along a meandering course within the gas processing space S from one end to the other end thereof.

Incidentally, to the dish-like container-forming member 41a, if necessary, within its recess, there is/are attached a gas feeding and/or discharging nozzle(s) 45 for establishing communication at a terminal end in the disposing direction of the baffle plates 46. That is, either gas-feeding or discharging nozzle 45 or both gas-feeding and discharging nozzles will be attached thereto.

Next, additional explanation will be made on a method of manufacturing the container B.

First, by press-forming of a heat-resistant metal plate of e.g. stainless steel, the dish-like container-forming member 41a is prepared.

Then, a hole for attaching the nozzle 45 is formed in the dish-like container-forming member 41a and the porous plates 44 or baffle plates 46 are attached thereto by means of spot-welding.

Thereafter, if charging of catalyst is necessary, the accommodating space is charged with the catalyst. If the container B is the single-space container Bm, the flat plate-like container-forming member 41*b* is placed over the dish-like container-forming member 41*a* and their peripheral portions are joined together by means of seam-welding.

On the other hand, if the container B is the two-space containing container Bd, the partitioning member 42 is placed over the dish-like container-forming member 41*a* and their peripheral portions are jointed together by means of spot-welding to accommodate catalyst therein. Then, this dish-like container-forming member 41*a* accommodating catalyst is placed over another dish-like container-forming member 41*a* (no partitioning member is attached thereto) or another dish-like container-forming member 41 having the baffle plates 46 attached thereto, and then their peripheral portions are joined together by means of seam-welding.

Incidentally, the welding operation of the peripheral portions of the pair of container-forming members 41 may be carried out automatically by using a commercially available automatic seam-welding machine.

As shown in FIG. 1, in the instant embodiment, the fluid processing apparatus P includes eight two-space containing containers Bd and one single-space containing container Bm, with the container Bm being at the third position in the disposing row from the left end thereof in the front view.

In order to clearly distinguish among the eight two-space containing containers Bd, the reference mark "Bd" denoting these two-space containing containers is accompanied by one of numerals 1, 2, 3 . . . 8 denoting the disposing order from the left end of the row.

In juxtaposing these eight two-space containing containers Bd and the one single-space containing container Bm, the left-end two-space containing container B*d*1 and the second two-space containing container B*d*2 are juxtaposed with a heat insulating material 14 interposed therebetween; the second two-space containing container B*d*2 and the single-space containing container Bm are juxtaposed in close contact with each other; the single-space containing container Bm and the third two-space containing container B*d*3 are juxtaposed with a heat insulating material 14 interposed therebetween, the third two-space containing container B*d*3 and the fourth two-space containing container B*d*4 are juxtaposed with a heat insulating material 14 interposed therebetween; and the fourth two-space containing container B*d*4 through the eighth two-space containing containers B*d*4 through B*d*8 are juxtaposed with close contact with each other.

The fourth two-space containing container B*d*4 includes a right processing space as a fluid passage unit and a left processing space S as a reaction unit. And, in this two-space containing container B*d*4, a communication hole 42*w* for communicating the two processing spaces S with each other is defined at an upper end of the partitioning member 42 and there are also attached a nozzle 45 for communicating with the lower end of the right processing space S and another nozzle 45 for communicating with the lower end of the left processing space S.

Then, the right processing space S of the two-space containing container B*d*4 is constructed as the raw fuel gas passage unit 13, whereas the left processing space S thereof is charged with a number of ceramic porous particles retaining desulfurization catalyst, thus acting as the desulfurization reaction unit 1.

Referring to the third two-space containing container B*d*3, both its processing spaces S are constructed as fluid passage units. Each processing space S is charged with a heat-transfer promoting material comprising e.g. stainless wool, and nozzles 45 are attached to upper and lower portions of each of the processing spaces S.

Then, the left processing space S of the two-space containing container B*d*3 is constructed as the reforming gas passage unit 11, whereas the right processing space S thereof is constructed as the upstream reformed-gas passage unit 10, respectively.

Referring to the second two-space containing container B*d*2, both its processing spaces S are constructed as the reaction units, and nozzles 45 are attached to upper and lower portions of each of the processing spaces S. The right processing space is charged with a number of ceramic porous particles 17 retaining reforming reaction catalyst such as ruthenium, nickel platinum, thus forming the reforming reaction unit 3, whereas the left processing space is charged with a honeycomb member 18 retaining a combustion reaction catalyst such as platinum, platinum-rhodium, etc., thus forming the combustion reaction unit 6.

Referring to the single-space containing container Bm, its single processing space S is constructed as a fluid passage unit, and to this processing space S, nozzles 45 are attached to upper and lower portions thereof, so that the space is constructed as a temperature-keeping reformed-gas passage unit 19 for passing the reformed gas discharged from the reforming reaction unit 3 to keep the temperature of the reforming reaction unit 3, as will be described hereinafter.

Referring to the fifth two-space containing container B*d*5, the left processing space S is constructed as a fluid passage unit and the right processing space S is constructed as a reaction unit. And, in this two-space containing container B*d*5, a communication hole 42*w* for communicating the two processing spaces S with each other is formed at the upper end of the partitioning member 42 and there are attached a nozzle 45 for communicating with the lower end of the left processing space S and a further nozzle 45 for communicating with the lower end of the right processing space S.

And, the left processing space S is constructed as the downstream reformed-gas passage unit 12, whereas the right processing space S is charged with a number of ceramic porous particles 20 retaining a metamorphic reaction catalyst such as iron oxide, copper and zinc, etc., thus forming the metamorphic reaction unit 4.

Referring to the sixth two-space containing container B*d*6, the left processing space S is constructed as a reaction unit and the right processing space S is constructed as a fluid passage unit, and nozzles 45 are attached to upper and lower portions of each of the processing spaces S.

The left processing space S is charged with a number of ceramic porous particles retaining metamorphic reaction catalyst, thus forming the metamorphic reaction unit 4, and the right processing space S is constructed as the metamorphic-reaction unit cooling-fluid passage unit 8.

Referring to the seventh two-space containing container B*d*7, both its processing spaces S are constructed as reaction units. And, in this two-space containing container B*d*7, a communication hole 42*w* for communicating the two processing spaces S with each other is formed at the upper end of the partitioning member 42 and there is attached a nozzle 45 for communicating with the lower end of the respective processing spaces S.

And, each of the two processing spaces S is charged with a number of ceramic porous particles retaining metamorphic reaction catalyst, thus forming the metamorphic reaction unit 4.

Referring to the leftmost two-space containing container B*d*8, the left processing space S is constructed as a fluid passage unit and the right processing space S is constructed as a reaction unit. Nozzles 45 are attached to upper and lower portions of each of the two processing spaces S.

And, the left processing space S is constructed as the oxidation cooling-fluid passage unit 8 and the right processing space S is charged with a number of ceramic porous particles retaining selective-oxidation reaction catalyst such as ruthenium, platinum, thus forming the oxidation reaction unit 5.

Referring to the leftmost two-space containing container B$d$1, both its processing spaces S are constructed as fluid passage units. And, each processing space S is charged with heat-transfer promoting material 43 such as stainless wool, and nozzles 45 are attached to upper and lower portions of each of these processing spaces S.

And, the left processing space S of this two-space containing container B$d$1 is constructed as the water-vapor generating unit 2 and the right processing space S thereof is constructed as the heating-fluid passage unit 7, respectively.

To the nozzle 45 attached to the lower portion of the raw fuel passage unit 13, there is connected a raw fuel feed conduit 15. Then, as the raw fuel gas flows upward through the raw fuel gas passage unit 13, it is heated by the reformed gas flowing through the downstream reformed gas passage unit 12 adjacent thereto. Then, this gas is caused to flow through the communication hole 42$w$ into the upper area of the desulfurization reaction unit 1 and then flows down in this desulfurization reaction unit 1 to be desulfurized thereby.

A desulfurized gas conduit 25 connected to the nozzle 45 attached to the lower portion of the desulfurization reaction unit 1 and a water-vapor conduit 26 connected to the nozzle connected to the upper portion of the water-vapor generating unit 2 are connected to an ejector 27. A reforming gas conduit 28 connected to this ejector 27 is connected to the nozzle 45 attached to the lower portion of the reforming gas passage unit 11, and the nozzle attached to the upper portion of the reforming gas passage unit 11 and the nozzle 45 attached to the upper portion of the reforming reaction unit 3 are connected to the reforming gas conduit 28. In operation, the desulfurized gas discharged from the desulfurization reaction unit 1 and the water vapor generated from the water-vapor generating unit 2 are mixed at the ejector 27, and as the reforming gas (gas to be reformed) which is the mixture gas of the desulfurized gas and the water vapor is caused to flow upward through the reforming gas passage unit 11, it is heated by the reformed gas flowing through the upstream reformed gas passage unit 10 adjacent thereto, then, the gas is caused to flow into the reforming reaction unit 3 from the upper portion thereof. Then, as the gas flows down through the reforming reaction unit 3, it is reformed by the heating from the combustion reaction unit 6.

Incidentally, in case the raw fuel gas is natural gas containing methane gas as its main component, the reforming reaction of methane gas and water vapor is effected under a heated condition of about 700 to 750° C. according to the following reaction formula, thereby to produce a reformed gas containing hydrogen gas and carbon monoxide.

$$CH_4 + H_2O \rightarrow CO + 3H_2$$

The nozzle 45 attached to the lower portion of the reforming reaction unit 3 and the nozzle 45 attached to the lower portion of the temperature-keeping reformed-gas passage unit 19, also the nozzle 45 attached to the upper portion of this temperature-keeping reformed gas passage unit 18 and the nozzle 45 attached to the upper portion of the upstream reformed gas passage unit 10 and also the nozzle 45 attached to the lower portion of the upstream reformed gas passage unit 10 and the nozzle 45 attached to the lower portion of the downstream reformed gas passage unit 12, are connected, respectively, via the reformed gas conduit 29. In operation, the reformed gas discharged from the reforming reaction unit 3 is caused to flow through the temperature-keeping reformed gas passage unit 19, the upstream reformed gas passage unit 10, the downstream and then reformed gas passage unit 12, one after another. Then, it is caused to flow through the communication hole 42$w$ into the upper area of the metamorphic reaction unit 4.

The nozzle 45 attached to the lower portion of the metamorphic reaction unit 4 formed by the fifth two-space containing container B$d$5, the nozzle 45 attached to the upper portion of the metamorphic reaction unit 4 formed by the sixth two-space containing container B$d$6, the nozzle 45 attached to the lower portion of the left metamorphic reaction unit 4 formed by the seventh two-space containing container B$d$7, the nozzle 45 attached to the lower portion of the right metamorphic reaction unit 4 formed by the seventh two-space containing container B$d$7, and the nozzle 45 attached to the lower portion of the oxidation reaction unit 5 are connected via the metamorphic reaction gas conduit 30, respectively. Further, a hydrogen-gas containing gas conduit 31 is connected to the nozzle 45 attached to the upper portion of the oxidation reaction unit 5.

In operation, the reformed gas discharged from the reforming reaction unit 3 is caused to flow through the 4 (four) metamorphic reaction units 4 one after another, so that carbon monoxide gas contained in the reformed gas is metamorphosed into carbon dioxide gas. And, the metamorphosed gas discharged from the most downstream metamorphic reaction unit 4 is caused to flow into the lower area of the oxidation reaction unit 5, and as this gas flows up through the oxidation reaction unit 5, any carbon monoxide gas remaining in the metamorphosed gas is oxidized, whereby hydrogen-containing gas with reduced carbon monoxide content is withdrawn through the hydrogen-containing gas conduit 31. The exhaust fuel gas flowing in the metamorphic reaction unit cooling-fluid passage unit 8 adjacent the metamorphic reaction unit 4 and the combustion air flowing in the oxidation reaction unit cooling-fluid passage unit 9 are used for cooling the metamorphic reaction units 4, and the combustion air flowing in the oxidation reaction unit cooling fluid passage unit 9 adjacent the oxidation reaction unit 5 is used for cooling the oxidation reaction unit 5.

At the metamorphic reaction unit 4, the metamorphic reaction between the carbon monoxide present in the reformed gas and the water vapor is effected under a heated condition of about 200 to 400° C. according to the following reaction formula, thereby to metamorphose the carbon monoxide gas into carbon dioxide gas.

$$CO + H_2O \rightarrow CO_2 + H_2$$

The nozzle 45 attached to the lower portion of the combustion reaction unit 6 is connected to the combustion gas feed passage 22, the nozzle 45 attached to the lower portion of the oxidation reaction unit cooling-fluid passage unit 9 is connected to a combustion air feed passage 23, and a combustion air passage 32 connected to the nozzle 45 attached to the upper portion of the oxidation reaction unit cooling-fluid passage unit 9 is connected to the combustion gas feed passage 22. In operation, after the combustion gas is mixed with the combustion air which has been heated in advance in the course of its passage through the oxidation reaction unit cooling-fluid passage unit 9, this mixture gas is fed into the combustion reaction unit 6 from the lower portion thereof. As the gas flows upward through this combustion reaction unit 6, catalytic combustion of the gas takes place by the function of the combustion reaction catalyst.

The nozzle 45 attached to the upper portion of the combustion reaction unit 6 and the nozzle 45 attached to the upper portion of the heating-fluid passage unit 7 as well as the nozzle 45 attached to the lower portion of the heating-fluid passage unit 7 and the nozzle 45 attached to the lower portion of the metamorphic reaction cooling-fluid passage unit 8, are connected respectively via a combustion exhaust gas passage 33. Further, a further combustion exhaust gas passage 34 is connected to the nozzle 45 attached to the upper portion of the metamorphic reaction unit cooling-fluid passage unit 8.

In operation, the combustion exhaust gas discharged from the combustion reaction unit 6 is caused to flow through the heating-fluid passage unit 7 so as to heat the water-vapor generating unit 2 in the course of this. Then, this combustion exhaust gas which has been reduced in its temperature as a result of having heated the water-vapor generating unit 2 is caused to flow through the metamorphic reaction unit cooling-fluid passage unit 8 to cool the metamorphic reaction unit 4 adjacent thereto, and then the gas is discharged.

On the other hand, at the water-vapor generating unit 2, the water fed from the water feed passage 24 is evaporated by the heating from the heating-fluid passage unit 7, and the resultant water vapor is fed through an ejector 27 into the reforming reaction unit 3 to be used in the reforming reaction therein.

That is to say, in juxtaposing the plurality of processing spaces S constituting the fluid processing apparatus P, the processing space S forming the reforming reaction unit 3 requiring the highest temperature is disposed between the combustion reaction unit 6 and the temperature-keeping reformed gas passage unit 19. Then, the heat insulating materials 14 are disposed on the opposite sides of this assembly. Further, on the opposite sides thereof, the respective processing spaces S are disposed one after another in the order to reducing temperature. And, at the terminal ends in the juxtaposing direction, the processing spaces S forming the oxidation reaction units 5 are disposed. With these, the respective processing spaces S can be adjusted to respective appropriate temperatures while minimizing radiation loss, thus reducing the cost of producing the hydrogen-containing gas.

Next, additional explanation will be made on the pressing means H.

Figure 8:
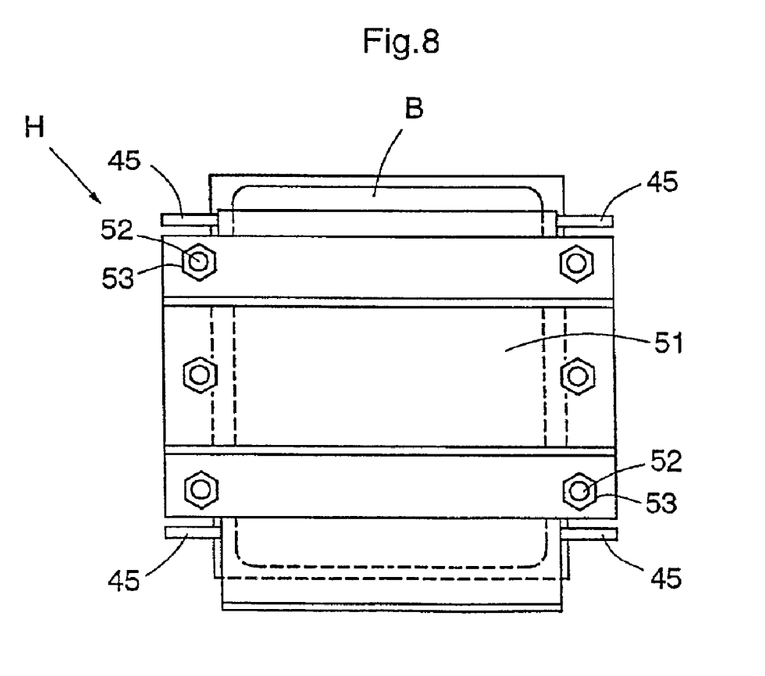
FIG. 8 is a side view showing an overall schematic construction of the fluid processing apparatus for producing hydrogen-containing gas.

As shown in FIGS. 7 and 8, the pressing means H includes a pair of holder plates 51 respectively attached to the containers B disposed at the opposed terminal ends in the juxtaposing direction and 6 (six) sets of screw connecting means.

Each set of the screw connecting means includes a bolt 52, a pair of nuts 53 and a pair of spring washers 54.

Each holder plate 51 is provided as an L-shaped member and is reinforced with two reinforang ribs 55.

The bolt 52 is inserted into the holder plates 51 with the bolt projecting from the opposed ends thereof. Then, the nuts 53 are fitted on the opposed projecting portions of the bolt 52 with the spring washers 54 interposed therebetween. Then, by tightening these nuts 53, the plurality of containers B are pressed from the opposed ends thereof while allowing their movement relative to each other in the direction normal to the juxtaposing direction. Further, expansion/contraction of the respective containers B in the juxtaposing direction also is allowed to some extent by expansion/contraction of the spring washers 54.

Incidentally, the pair of holder plates 51 are disposed erect and the plurality of containers B are disposed therebetween as being supported by these holder plates 51 from the opposed sides.

Figure 10:
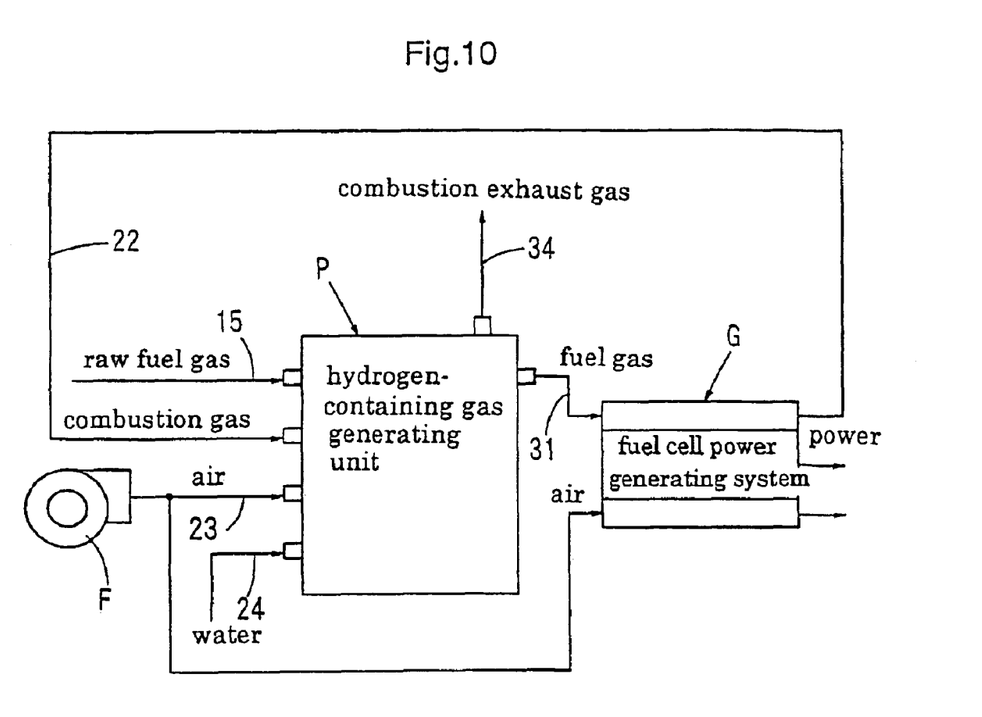
FIG. 10 is a block diagram of a fuel cell power generating system employing the fluid processing apparatus.

Next, with reference to FIG. 10, there will be described a fuel cell power generating system utilizing the fluid processing apparatus P having the above-described construction.

The fuel cell power generating system includes a fuel cell power generating unit G adapted for receiving fuel gas containing hydrogen gas and oxygen gas and outputting electric power and a blower F for feeding air as the oxygen-containing gas to the fuel cell power generating unit G.

The fuel cell power generating unit G receives, as the fuel gas, the hydrogen-containing gas withdrawn from the hydrogen-containing gas conduit 31 of the fluid processing apparatus P.

Further, in order to feed exhaust fuel gas discharged from the fuel cell power generating unit G as the fuel gas to the combustion reaction unit 6 of the fluid processing apparatus P, the combustion gas feed passage 22 is connected to a fuel gas exhaust portion of the fuel cell power generating unit G.

Also, in order to feed the combustion air to the combustion reaction unit 6, the blower F is connected also to the combustion air feed passage 23.

Though not described in further details herein, the fuel cell power generating unit G includes a plurality of cell modules each having an electrolytic layer, an oxygen electrode provided on one side of the layer and a fuel electrode provided on the other side of the same. As the oxygen-containing gas is supplied to the oxygen electrode and the fuel gas to the fuel electrode of each cell module, an electrochemical reaction between hydrogen and oxygen takes in each cell module, thereby to generate electric power.

Incidentally, the fuel cell power generating unit is of a high molecular type employing a high molecular film as its electrolyte.

OTHER EMBODIMENTS

Next, other embodiments will be described.

(1) In the foregoing embodiment, the desulfurization reaction unit 1, water-vapor generating unit 2, reforming reaction unit 3, oxidation reaction unit 5 and the fuel reaction unit 6 are each formed of a single processing space S. Instead, depending on the processing amount, the number of the processing space(s) S may varied for forming each unit.

Further, in the foregoing embodiment, the metamorphic reaction units 4 are formed of four processing spaces. However, the number of processing spaces S forming the metamorphic reaction units 4 may vary, depending on the amount of metamorphic reaction to be effected. And, only one may be provided.

Also, in the foregoing embodiment, the passage units, i.e. heating-fluid passage unit 7, metamorphic-reaction cooling-fluid passage unit 8, oxidation-reaction unit cooling-fluid passage unit 9, upstream reformed-gas passage unit 10, reforming gas passage unit 11, downstream reformed-gas passage unit 12, raw fuel gas passage unit 13 and the temperature-keeping reformed-gas passage unit 19, etc. are each formed of a single processing space S. However, the number of processing spaces S for forming each passage unit may vary, depending on e.g. the amount of heat exchange to be effected therein.

(2) In case carbon monoxide gas may be contained in the hydrogen-containing gas employed or it is not necessary to significantly reduce the carbon monoxide gas content, the oxidation reaction unit 5 may be omitted, or both the metamorphic reaction unit 4 and the oxidation reaction unit 5 may be omitted.

(3) The kind of raw fuel is not limited to methane gas described in the foregoing embodiment. And, depending on the kind of raw fuel employed, the respective constructions of the desulfurization reaction unit 1, water-vapor generating unit 2, reforming reaction unit 3, oxidation reaction unit 5 and the combustion reaction unit 6, may be modified. Or, one or some of these desulfurization reaction unit 1, water-vapor generating unit 2, reforming reaction unit 3, oxidation reaction unit 5 and the combustion reaction unit 6, may be omitted.

For instance, if the raw fuel employed is e.g. ethanol having low or zero sulfur content, the desulfurization reaction unit 1 may be omitted.

Further, if ethanol is employed as the raw fuel, it may be reformed at a lower temperature (about 250° C.). Then, the combustion reaction unit 6 for heating the reforming reaction unit 3 may be omitted, and a different heating source may be employed.

(4) The disposing direction of the containers B is not limited to the horizontal direction illustrated in the foregoing embodiment. It may be a vertical direction, for example.

(5) The juxtaposing arrangement (disposing order) of the desulfurization reaction unit 1, water-vapor generating unit 3, reforming reaction unit 3, oxidation reaction unit 5, combustion reaction unit 6, heating-fluid passage unit 7, metamorphic-reaction unit cooling-fluid passage unit 8, oxidation-reaction unit cooling-fluid passage unit 9, upstream reformed-gas passage unit 10, reforming gas passage unit 11, downstream reformed-gas passage unit 12, raw fuel gas passage unit 13 and the temperature-keeping reformed gas passage unit 19, is not limited to the arrangement illustrated in the foregoing embodiment, by may vary appropriately.

(6) The material or member for retaining the respective catalysts for the desulfurization reaction, reforming reaction, metamorphic reaction and selective oxidation reaction is not limited to the ceramic porous particles illustrated in the foregoing embodiment. Instead, it may be e.g. a honeycomb member.

Further, the member or material for retaining the combustion reaction catalyst is not limited to the honeycomb member 18 illustrated in the foregoing embodiment. Instead, it may be ceramic porous particles.

(7) In the foregoing embodiment, the combustion reaction unit 6 is formed by mounting the honeycomb member 18 retaining combustion reaction catalyst within the processing space S for effecting catalytic combustion of the fuel gas. Instead of this, a burner may be provided for combusting the fuel gas inside the processing space S.

(8) The specific construction of the pressing means H is not limited to that illustrated in the foregoing embodiment. For instance, this may be a construction for bracing the plurality of containers B by means of a wire.

(9) The specific shape of the container B is not limited to the rectangular flat plate-like shape illustrated in the foregoing embodiment. It may be any other shape as desired.

(10) When the invention's fluid processing apparatus is used with a fuel cell power generating system, instead of the high molecular type fuel cell power generating unit illustrated in the foregoing embodiment, the invention's apparatus may be used also with various other types of fuel cell power generating units of e.g. the phosphate type, solid electrolyte type, etc.

INDUSTRIAL APPLICATIONS

For constructing a fluid processing apparatus for producing hydrogen-containing gas, including a plurality of processing spaces for processing fluid, it is possible to obtain such fluid processing apparatus which can achieve cost reduction while ensuring good durability.

For constructing a fluid processing apparatus including a plurality of processing spaces for processing fluid, it is possible to obtain such fluid processing apparatus which can achieve cost reduction while ensuring good durability.

What is claimed is:

1. A fluid apparatus for producing hydrogen-containing gas, the apparatus having a plurality of processing spaces, the apparatus comprising:

a plurality of containers juxtaposed in a direction to each other and respectively forming the processing space therein;

pressing means for pressing the containers as juxtaposed from opposed sides thereof in the juxtaposing direction of the containers;

wherein each said container includes a pair of container-forming members disposed in the juxtaposing direction and having peripheral portions thereof joined and welded to each other; and at least one of the pair of container-forming members is in the form of a dish-shaped member having a peripheral portion used as a joining margin and a bulging central portion.

2. A fluid processing apparatus for producing hydrogen-containing gas, the apparatus having a plurality of processing spaces, the apparatus comprising:

a plurality of containers juxtaposed in a direction to each other and respectively forming the processing space respectively therein;

pressing means for pressing the containers as juxtaposed from opposed sides thereof in the juxtaposing direction of the containers;

wherein each said container includes a pair of container-forming members disposed in the juxtaposing direction and having peripheral portions thereof joined and welded to each other; and at least one of the pair of container-forming members is in the form of a dish-shaped member formed by press-forming a plate material and having a peripheral portion used as a joining margin and a bulging central portion.

3. The fluid processing apparatus for producing hydrogen-containing gas as defined in claim 1, wherein some or all of the plurality of containers each includes a pair of the dish-shaped container-forming members joined and welded together with a planar plate-shated partitioning member interposed therebetween for forming two processing spaces.

4. The fluid processing apparatus for producing hydrogen-containing gas as defined in claim 2, wherein at least some of the plurality of containers each includes a pair of the dish-shaped container-forming members joined and welded together with a planar plate-shaped partitioning member interposed therebetween for forming two processing spaces.

5. The fluid processing apparatus as defined in claim 1, wherein the plurality of containers are disposed such that some of them requiring heat transfer therebetween are disposed in close contact with the other and others of them requiring adjustment in the amount of heat transferred therebetween are disposed with an insulating material for heat transfer adjustment being interposed therebetween.

6. The fluid processing apparatus as defined in claim 2, wherein the plurality of containers are disposed such that some of them requiring heat transfer therebetween are disposed in close contact with the other and others of them requiring adjustment in the amount of heat transferred therebetween are disposed with an insulating material for heat transfer adjustment being interposed therebetween.

7. The fluid processing apparatus as defined in claim 3, wherein the plurality of containers are disposed such that some of them requiring heat transfer therebetween are disposed in close contact with the other and others of them requiring adjustment in the amount of heat transferred therebetween are disposed with an insulating material for heat transfer adjustment being interposed therebetween.

8. The fluid processing apparatus as defined in claim 4, wherein the plurality of containers are disposed such that some of them requiring heat transfer therebetween are disposed in close contact with the other and others of them requiring adjustment in the amount of heat transferred therebetween are disposed with an insulating material for heat transfer adjustment being interposed therebetween.

9. The fluid processing apparatus for producing hydrogen-containing gas as defined in claim 1, wherein at least one of the processing spaces is charged with reforming reaction catalyst to act as a reforming reaction unit for effecting a reforming process in which a hydrocarbon raw fuel gas is reformed, by using water vapor, into hydrogen gas and carbon monoxide gas and at least another of the processing spaces is charged with metamorphic reaction catalyst to act as a metamorphic reaction unit for effecting a metamorphic process in which the carbon monoxide gas is metamorphosed, by using water vapor, into carbon dioxide gas, whereby the raw fuel gas is supplied to the reforming reaction unit to be reformed therein and the resultant reformed gas is supplied to the metamorphic reaction unit to be metamorphosed therein, so that the hydrogen-containing gas is produced by the apparatus.

10. The fluid processing apparatus for producing hydrogen-containing gas as defined in claim 9, wherein a processing space adjacent said reforming reaction unit is constructed as a combustion reaction unit for combusting fuel gas for heating the reforming reaction unit;

one of an adjacent pair of processing spaces is constructed as a water-vapor generating unit for generating water fed thereto and the other is constructed as a heating-fluid passage unit for passing exhaust fuel gas discharged from the combustion reaction unit to heat the water-vapor generating unit;

a processing space adjacent said metamorphic reaction unit is constructed as a cooling-fluid passage unit for passing the exhaust fuel gas discharged from the heating-fluid passage unit so as to cool the metamorphic reaction unit; and the water vapor generated at said water-vapor generating unit is supplied to the reforming reaction unit to be used in the reforming reaction therein.

11. The fluid processing apparatus for producing hydrogen-containing gas as defined in claim 2, wherein at least one of the processing spaces is charged with reforming reaction catalyst to act as a reforming reaction unit for effecting a reforming process in which a hydrocarbon raw fuel gas is reformed, by using water vapor, into hydrogen gas and carbon monoxide gas and at least another of the processing spaces is charged with metamorphic reaction catalyst to act as a metamorphic reaction unit for effecting a metamorphic process in which the carbon monoxide gas is metamorphosed, by using water vapor, into carbon dioxide gas, whereby the raw fuel gas is supplied to the reforming reaction unit to be reformed therein and the resultant reformed gas is supplied to the metamorphic reaction unit to be metamorphosed therein, so that the hydrogen-containing gas is produced by the apparatus.

12. The fluid processing apparatus for producing hydrogen-containing gas as defined in claim 11, wherein a processing space adjacent said reforming reaction unit is constructed as a combustion reaction unit for combusting fuel gas for heating the reforming reaction unit;

one of an adjacent pair of processing spaces is constructed as a water-vapor generating unit for generating water fed thereto and the other is constructed as a heating-fluid passage unit for passing exhaust fuel gas discharged from the combustion reaction unit to heat the water-vapor generating unit;

a processing space adjacent said metamorphic reaction unit is constructed as a cooling-fluid passage unit for passing the exhaust fuel gas discharged from the heating-fluid passage unit so as to cool the metamorphic reaction unit; and the water vapor generated at said water-vapor generating unit is supplied to the reforming reaction unit to be used in the reforming reaction therein.

\* \* \* \* \*

UNITED STATES PATENT AND TRADEMARK OFFICE
CERTIFICATE OF CORRECTION

| | |
|---|---|
| PATENT NO. | : 7,014,822 B1 |
| APPLICATION NO. | : 09/868222 |
| DATED | : March 21, 2006 |
| INVENTOR(S) | : Shinke et al. |

It is certified that error appears in the above-identified patent and that said Letters Patent is hereby corrected as shown below:

TITLE PAGE, Item (57) ABSTRACT, Line 9, "portions thereofjoined" should read -- portions thereof joined --

<u>Column 16</u>, delete Lines 13-16.

<u>Column 16,</u> Line 58, Claim 3, "planar plate-shated" should read -- planar plate-shaped --

Signed and Sealed this

First Day of August, 2006

JON W. DUDAS
*Director of the United States Patent and Trademark Office*